United States Patent

[11] 3,585,881

[72] Inventor Albert J. Sarka
 Fairview Park, Ohio
[21] Appl. No. 785,591
[22] Filed Dec. 20, 1968
[45] Patented June 22, 1971
[73] Assignee Harris-Intertype Corporation
 Cleveland, Ohio

[54] METHOD OF MAKING CUTTING AND CREASING DIES
 8 Claims, 4 Drawing Figs.
[52] U.S. Cl.......................................... 76/107,
 51/254
[51] Int. Cl....................................... B21k 5/20
[50] Field of Search............................ 76/107;
 93/58, 58.2; 51/254

[56] References Cited
 UNITED STATES PATENTS
 2,674,835 4/1954 Senft............................ 51/254
 3,142,233 7/1964 Downie........................ 93/58
 3,468,075 9/1969 Armstrong................... 51/254
 1,516,524 11/1924 Fellows........................ 90/3

*Primary Examiner*—Bernard Stickney
*Attorney*—Yount, Flynn and Tarolli

ABSTRACT: Platelike sheet material cutting and creasing dies have lands projecting from one surface of a base portion of the die. The lands have a working surface portion at the outer ends thereof. Such material cutting and creasing dies are made by forming lands in sheet metal stock with the lands projecting from one side of the sheet metal stock and located to perform work at selected locations on sheet material. The sheet metal stock with lands formed thereon is then mounted on a cylinder with the other side thereof in substantially intimate contact with the cylinder surface. The outer ends of the lands are then ground while the cylinder is rotated so that the working surfaces of all of the lands are located an accurate uniform dimension relative to the axis of the cylinder.

PATENTED JUN22 1971
3,585,881
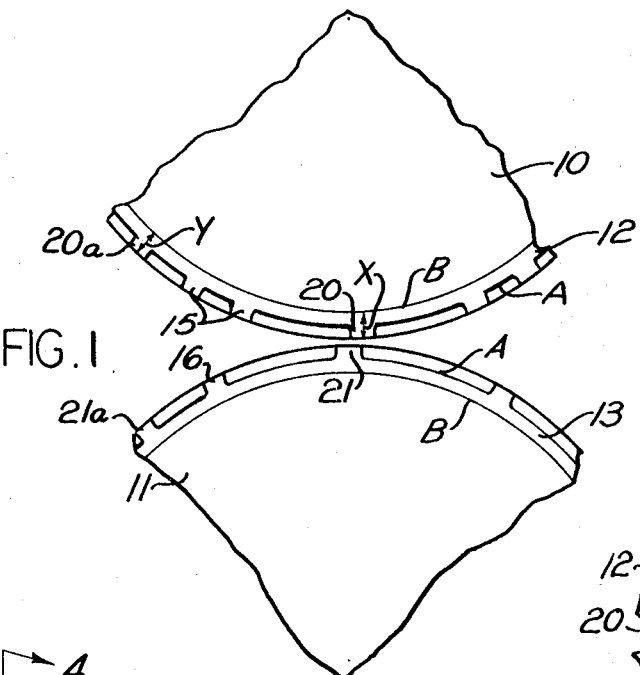
FIG.1
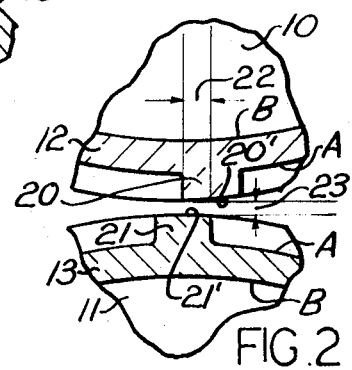
FIG.2
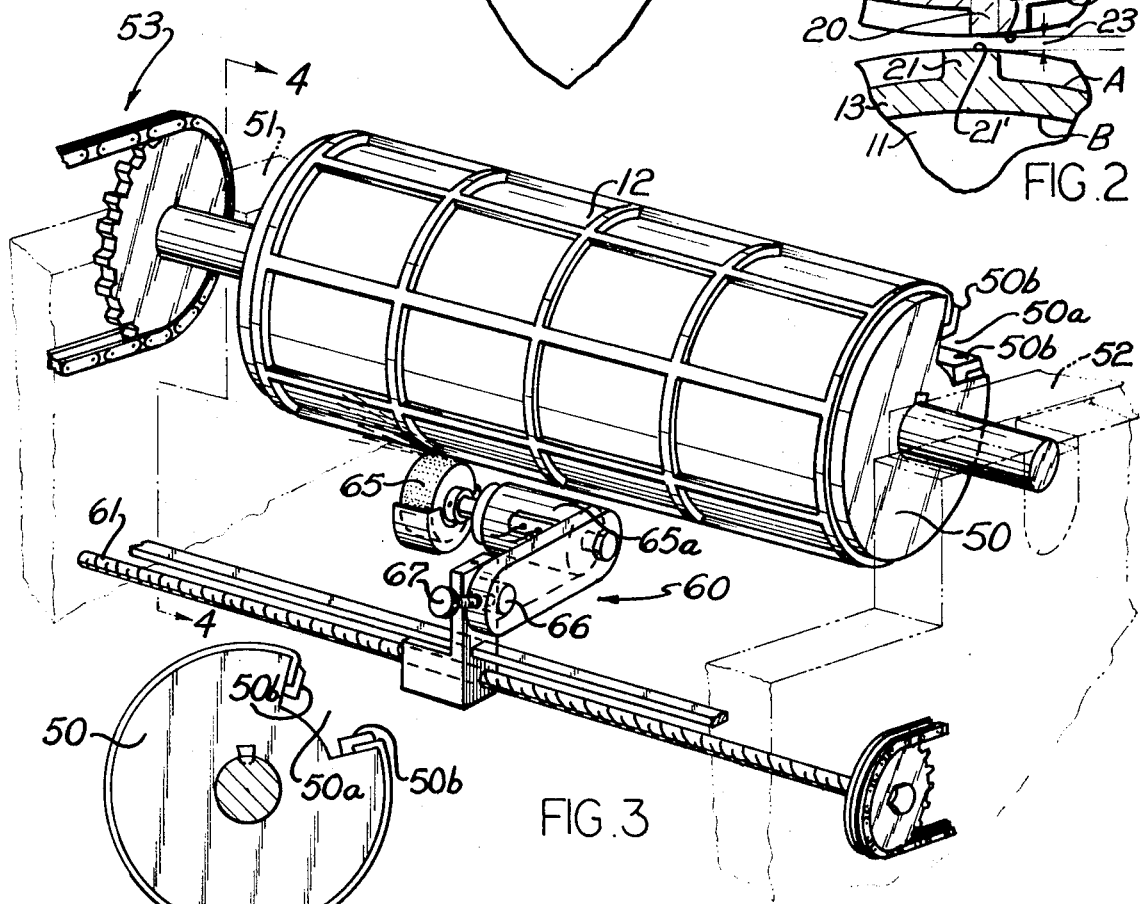
FIG.3
FIG.4
INVENTOR.
ALBERT J. SARKA
BY
Yount, Flynn & Tarolli
ATTORNEYS

METHOD OF MAKING CUTTING AND CREASING DIES

The present invention relates to a method of making cutting and creasing dies, and particularly relates to a method of making sheet material cutting and creasing dies which have lands projecting from a base portion of the die and wherein the lands have a working surface portion at the outer end thereof.

The Downie U.S. Pat. No. 3,142,233 discloses cutting and creasing dies which are used in the cutting and creasing of sheet material. Each of the dies comprises a base portion with projections or lands extending from one side thereof. The dies are mounted on adjacent cylinders so that the projections on one die cooperate with projections on the other die to effect a work operation on sheet material which is located between the dies. The lands or projections are located on the plate in a pattern so as to either cut or crease the sheet material in the desired location. The creasing is effected by a male land on one die which presses the sheet material between female lands located on the other die. The cutting of the sheet material is effected by cutting lands on one die which cooperate with cutting lands on another die. The cutting lands overlap each other in the plane of the sheet material during cutting. Moreover, these lands have a radial gap or space therebetween during the cutting of the sheet material.

Dies such as disclosed in the Downie U.S. Pat. No. 3,142,233 have been utilized in rotary cutting and creasing machines, and examples of such machines are disclosed in U.S. Pat. Nos. 3,375,762 and 3,383,991. When the dies, as disclosed in U.S. Pat. No. 3,142,233 and as mentioned hereinabove, are mounted on cylinders to effect the cutting and creasing of sheet material advanced between the cylinder nips, certain problems of accuracy are encountered. In particular, the radial gap between the lands which effect the cutting of the sheet material is extremely critical in order to provide for proper cutting of the material. In particular, this radial gap is critical for the cutting of very thin sheet materials. It is desirable, therefore, to maintain this radial gap within a close tolerance.

Maintaining the radial gap between the cutting lands within close tolerances has been a problem due to irregularities in the sheet metal stock from which the dies are made. The sheet metal stock from which the dies are made may vary in thickness over the extent thereof. This is particularly the case for relatively wide sheet metal stock in which thin areas are formed, especially at the edges of the sheet metal stock due to the rolling of the metal. These irregularities in the thickness of the sheet metal stock end up in the die plates and as a result die plates constructed from such sheet stock have lands where the working surface of the lands are located at different radii from the axis of rotation of the cylinder on which the die plate is mounted.

It has been discovered that the problem of maintaining a close tolerance on the radial gap between the cutting lands of die plates mounted on cutting and creasing cylinders can be solved by locating the working surfaces of all of the lands on a given die plate on a cylinder at the same radial dimension from the axis of rotation of the cylinder. As a result, since each working surface on each die plate is at the same radial dimension from the axis of rotation of the cylinder, the gap between the working surfaces of all of the lands on a set of cylinders will be substantially uniform.

This uniform radial location of the working surfaces of the lands on a given die plate with respect to the axis of rotation of the cylinder on which the die plate is mounted is effected by the present invention. This is accomplished by forming the die plates in the usual manner, and as an additional step in the method of forming the die plates, mounting the die plates on a cylinder and grinding the working surfaces of the lands on the die plates while the cylinder is rotating by a grinding mechanism located at a fixed predetermined distance from the axis of rotation of the cylinder.

Accordingly, the principal object of the present invention is the provision of a new and improved simple, reliable method of making a platelike sheet material cutting die which has lands with working surfaces at the outer ends thereof so that the working surfaces of the lands on the die plate are located a substantially uniform accurate distance relative to the axis of rotation of the cylinder on which the die plate is to be mounted.

A further object of the present invention is the provision of a new and improved method of making a platelike sheet material cutting die, as noted hereinabove, wherein during the method of making the die plate, sheet metal stock with lands formed thereon is mounted on a cylinder in substantially intimate contact with the cylinder surface and the working surfaces of the lands are ground while the cylinder is rotating so that all of the lands will be located at an accurate uniform dimension relative to the axis of the cylinder.

A further object of the present invention is the provision of a new and improved method of making a pair of cooperating cutting dies having lands thereon and adapted to be mounted on respective rotary cylinders and wherein the radial gaps between all cooperating cutting lands on the die plates during cutting are of a substantially uniform dimension.

Further objects and advantages of the present invention will be apparent to those skilled in the art to which it relates from the following detailed description of a preferred embodiment thereof made with reference to the accompanying drawings in which:

FIG. 1 is a schematic view illustrating cutting and creasing dies of the present invention mounted on cutting and creasing cylinders;

FIG. 2 is an enlarged view of FIG. 1 illustrating cutting lands in operative position;

FIG. 3 is a view of a grinding operation in which the working surfaces of the lands of the cutting and creasing dies are ground; and FIG. 4 is a schematic side elevational view of the grinding operation of FIG. 3.

The present invention provides an improved method of making cutting and creasing sheet material dies of the platetype. The dies include projecting lands which cooperate to effect cutting and creasing of sheet material advanced between the dies. The improved method is directed to the manufacture of die plates as disclosed in U. S. Pat. No. 3,142,233. The present invention provides a method of manufacturing the dies in a more accurate manner so as to provide more uniform cutting and better ensure cutting and creasing of extremely thin sheet materials.

FIG. 1 illustrates a cutting and creasing apparatus which includes cutting and creasing cylinders 10, 11. The cutting and creasing cylinders 10, 11 have cutting and creasing die plates 12, 13, respectively, mounted thereon. The cutting and creasing die plates 12, 13 are of a general construction similar to that disclosed in U.S. Pat. No. 3,142,233. The cutting and creasing die plates 12, 13 also could be as disclosed in copending application Ser. No. 700,538, now U.S. Pat. No. 3,485,146, issued Dec. 23, 1969, assigned to the assignee of the present invention.

The cutting and creasing die plates 12, 13 have a pattern of lands thereon which cooperate to effect cutting and creasing of sheet material. The die plate 12 may be considered to be the female die plate and has scoring lands 15 which are located adjacent each other and define therebetween an area in which a cooperating male scoring element 16, located on the die plate 13, may press material advanced therebetween. When the land 16 presses the material between the lands 15, the material is scored.

The die plates 12, 13 also have cutting lands 20, 21, respectively, thereon. All of the lands on the die plates 12, 13 project from one side A of a base portion of the die plates. The other side B of the die plates is planar. The cutting lands 20, 21, as illustrated in FIG. 2, have an overlap, designated 22, in the plane of the material. The lands 20, 21 also have a radial gap 23 between the outer working surfaces 20', 21' thereof. The radial gap 23 is in the order of 0.002 inch and may vary, as described in U.S. Pat. No. 3,142,233. The dimension of the gap 23 is extremely critical in the cutting of the sheet material, and particularly the gaps 23 between the respective cooperating lands should be substantially uniform and held to close tolerances for cutting very thin sheet material stock.

When the cutting and creasing die plates 11, 12 are being used for cutting of thin stocks, the gaps 23 between the various cooperating cutting lands as the cylinders 10, 11 rotate should be substantially uniform. Any irregularities in the thickness of the metal stock which is used in the forming of the sheet metal dies 12, 13 will vary the dimension of the gap. As should be apparent from FIG. 1, if the thickness of the material designated X varied from the thickness designated Y, then the dimension of the radial gap between the land 20a and the cooperating land 21a on the cylinder 11 when cutting would vary from that of the radial gap between the lands 20, 21. This variance of the dimension of the radial gap 23 which occurs during rotation of the cylinders cannot readily be compensated for by adjustment of the cylinders, for any adjustment of the cylinders to compensate for a radial gap variance will affect all of the other gaps in a like manner, and therefore, when the cylinders are adjusted for the proper gap for one set of cooperating cutting lands, this might destroy the gap setting for the other cutting lands on the same die plates.

The provision of an accurate uniform gap between all of the cooperating cutting lands is accomplished by the present invention due to improvements in the method of manufacture of the die plates. In accordance with the present invention, the die plates are made in basically the same manner as that described in U.S. Pat. No. 3,142,233. In the manufacture of those dies plates, the sheet metal stock is coated with a light-sensitive coating. A master plan view drawing of the cutting elements for the male and female plates, exactly as they are to appear in the finished die plate, is made and photographically imposed on the light-sensitive coating. That is, photographically the image of the lands which are to appear on the final die plate is produced on the surface of the light-sensitive coating. The light-sensitive coating is then removed from the die plate in the areas surrounding the lands, but the light-sensitive coating remains in the areas where the lands are to be formed. The sheet metal stock is then chemically milled or etched to remove the metal from those areas of the plate not bearing the coating and which are nonland areas. As a result of the etching of the nonland areas, the lands remain projecting above the base portion of the die plate and the outer surfaces of the lands constitute the surfaces which engage the material and which effect the cutting and creasing thereof.

The die plates 12, 13 may be made of any of a variety of etchable metals, preferably steel. The etching medium used will depend upon the particular metal which is to be etched, as is well known in the art. Various methods and manufacturing techniques are known for forming the sheet metal stock into the dies with the lands projecting therefrom.

After the die plates are made in the manner described hereinabove, and as disclosed in U.S. Pat. No. 3,142,233, the die plates 12, 13 are mounted on a cylinder 50, as disclosed in FIG. 2. The cylinder 50 is provided with an axial gap 50a in which plate clamps 50b are located and which clamp the die plates on the cylinder with the plates in an intimate continuous contact therewith. The cylinder 50 is supported at its opposite ends in frame supports 51, 52 and is rotated by a suitable drive 53 about its axis relative to the frame supports 51, 52. In FIG. 3, the die plate 12 is shown on the cylinder 50. A grinding mechanism, generally designated 60, is supported by the frame and operates to grind the outer surfaces of the lands while the cylinder 50 is rotated. The grinding mechanism 60 may take any of a variety of forms, and is illustrated herein only schematically.

In essence, the grinding mechanism 60 comprises a screw 61 which is supported by the frame supports 51, 52 in an extremely accurate parallel relation to the axis of rotation of the cylinder 50. A grinding unit which includes a grinding wheel 65 is supported on the screw 61 and upon rotation of the screw 61 will move axially along the screw 61 and in a direction parallel to the direction of rotation of the cylinder 50. The grinding wheel 65 is rotated in a suitable manner by motor 65a while the grinding unit is traversing the axial path of movement. The grinding wheel 65 may be positioned accurately with respect to the axis of rotation of the cylinder 50 by pivoting thereof about pivot pin 66. The grinding wheel 65 may be fixed at an adjusted position by set screw 67 at a desired location with respect to the location of the outer surfaces of the lands on the die plates. As a result, the grinding wheel will remove metal from the lands so as to make all of the outer working surfaces such as 20', 21' of the lands a uniform radial dimension from the axis of rotation of the cylinder 50. The grinding operation is performed on both of the cooperating die plates 12, 13 so that all of the lands on each die plate are located at an accurate uniform distance from the axis of rotation of the cylinder.

While the grinding wheel 65 is illustrated in the drawings as being located immediately beneath the cylinder 50, at what might be termed a "six o'clock" position, the position of the grinding wheel can vary therefrom. Preferably, the grinding wheel could be located at three or nine o'clock positions which would be 90° from the position illustrated in the drawings. In such positions, deflection of the cylinder due to its weight and the manner in which it is supported can be solved. Any such deflection should be avoided.

The grinding also may be effected while the die plates are on the cutting and creasing cylinders 10, 11, or as noted above, may be effected while the cutting and creasing plates are mounted on the cylinder 50. If the die plates are mounted on the cylinders 10, 11, and then ground, cylinder "runout" is also compensated for. Cylinder "runout" may be described as the cylindrical variance in the cylinder due to manufacturing inaccuracies. It is important that the plates 12, 13 be mounted so that they are in continuous intimate contact with the surface of the cylinder on which they are ground, whether the cylinder is the cutting and creasing cylinders 10, 11, or the cylinder 50.

If the die plates are ground on the cylinder 50, then the die plate is removed from the cylinder 50 and then placed on the cutting and creasing cylinders 10, 11 so that the back side thereof is in tight, intimate continuous contact with the cylinders 10, 11 over the entire surface area of the cylinders prior to cutting.

Since all of the working surfaces of all of the lands on a given die plate will be located at a uniform distance from the axis of rotation of the cylinders, if the above-described method is carried out, then the cylinders 10, 11 may be adjusted bodily in order to provide the appropriate gap 23 between the cutting and creasing lands. This gap will then be maintained substantially uniform due to the fact that all of the lands on the die plates 10, 11 are at a substantially uniform distance from the axis of rotation of the cylinder on which they are mounted.

Having described my invention, I claim:

1. A method of making a platelike sheet material cutting die having lands projecting from one surface of a base portion of the die with the lands having a working surface portion at the outer ends thereof, said method comprising the steps of forming lands in sheet metal stock with the lands projecting from a front side thereof and located to perform work at selected locations on the sheet material, mounting said sheet metal stock with the lands formed thereon on a cylinder with the back side thereof in substantially continuous intimate contact with the cylinder surface and said lands projecting radially outwardly thereof, and removing material from the outer ends of at least some of said lands while rotating the cylinder so that the working surfaces of all of the lands are located an accurate uniform radial distance from the axis of rotation of the cylinder.

2. A method of making a platelike sheet material cutting die as defined in claim 1 wherein the step of forming the lands in the sheet metal stock comprises the steps of applying a light-sensitive coating to one surface of the sheet metal stock, photographically producing on said one surface an image of said lands, treating said surface to remove the coating from nonland areas surrounding the lands, and then chemically milling the exposed nonland areas to a predetermined depth to provide said lands as raised areas above the nonland areas.

3. A method of making a platelike sheet material cutting die as defined in claim 1 wherein said step of removing material comprises the step of grinding the outer ends of the lands to effect said removal of material therefrom.

4. A method of making a platelike sheet material cutting die as defined in claim 3 wherein said grinding step is effected by a rotating grinding tool which is moved axially of the cylinder on which the sheet metal stock with the lands formed thereon is mounted while the cylinder rotates.

5. A method of making a pair of cooperable platelike sheet material cutting dies having cooperable cutting lands projecting above a base portion of the die and wherein said cutting lands on one die plate have working surface portions at the outer ends thereof and the cutting lands on the other die plate have working surface portions at the outer ends thereof, each working surface portion on the one die being spaced a predetermined distance from the working surface portions of the cooperating land on the other die when cutting, said method comprising the steps of forming lands projecting from one side of each of two sheets of metal stock with the lands on each sheet located to cooperate with lands on the other sheet to cut material therebetween, mounting said sheets of metal stock in a tightly held fashion on a cylinder with a second surface of the sheets of metal stock in intimate contact with the cylinder surface, and removing material from the outer surfaces of at least some of said lands of both sheets of metal stock while rotating the cylinder to provide the working surface portions of all of said lands on each respective sheet at an accurate uniform radial distance from the axis of rotation of the cylinder, whereby the spaces between the working surfaces of the various cooperating lands on the dies will be substantially uniform.

6. A method of making a pair of dies as defined in claim 5 wherein said step of removing material comprises the step of grinding the working surfaces of the lands.

7. A method of making a pair of dies as defined in claim 6 wherein said dies are ground while mounted on cylinders which define a nip through which the sheet material is advanced for cutting.

8. A method of making a platelike sheet material cutting die as defined in claim 5 wherein the step of forming the lands in the sheets of metal stock comprises the steps of applying a light-sensitive coating to one surface of the sheets of metal stock, photographically producing on said one surface an image of said lands, treating said surface to remove the coating from the nonland areas surrounding the lands, and chemically milling the exposed nonland areas to a predetermined depth to provide said lands as raised areas above the nonland areas.